United States Patent [19]

Kobayashi et al.

[11] Patent Number: 4,796,653
[45] Date of Patent: Jan. 10, 1989

[54] METHOD OF ENHANCING RESIDUAL COMPRESSIVE STRESS IN DOUBLE METALLIC TUBES

[75] Inventors: Masahiro Kobayashi, Ebina; Akitake Matsushita, Yokosuka; Hitoshi Nakamura; Shinji Tanaka, both of Yokohama; Shuji Furuya, Yokohama, all of Japan

[73] Assignees: Toshiba Corporation, Kawasaki; Ishikawajima-Harima Heavy Industries Co., Ltd., Tokyo, both of Japan

[21] Appl. No.: 54,895

[22] Filed: May 28, 1987

[30] Foreign Application Priority Data

May 30, 1986 [JP] Japan ................... 61-125504

[51] Int. Cl.⁴ .................. F16K 49/00; C21D 9/52
[52] U.S. Cl. ......................... 137/341; 165/2; 165/64; 148/146; 137/340
[58] Field of Search ............ 165/2, 64, 138, 177, 165/97; 137/340, 341, 1

[56] References Cited
U.S. PATENT DOCUMENTS

| | | | |
|---|---|---|---|
| 3,405,205 | 10/1968 | Rowe et al. | 165/64 |
| 3,645,326 | 2/1972 | Hochschorner et al. | 165/64 |
| 3,690,372 | 9/1972 | Niebisch | 165/64 |
| 4,229,235 | 10/1980 | Matsuda et al. | 148/127 |

*Primary Examiner*—A. Michael Chambers
*Attorney, Agent, or Firm*—Oblon, Fisher, Spivak, McClelland & Maier

[57] ABSTRACT

A method of enhancing residual compressive stress in a horizontal double metallic pipe which includes an outer pipe and an inner pipe fitted into the outer pipe. Cooling water is introduced into both the inner pipe and an annular space defined between the inner pipe and the outer pipe. Further, cooling water is injected into the annular space to form a partial cooling water flow through the cooling water in the annular space. During the injection of cooling water, the outer pipe is heated from the outside thereof to generate a temperature difference between inner and outer faces of the outer pipe to such a degree that thermal stress larger than a yield point is produced in the outer pipe. Then, the heating of the outer pipe is stopped to allow the outer pipe to stand, whereby residual compressive stress is provided to a radially inner portion of the outer pipe.

2 Claims, 2 Drawing Sheets

1

METHOD OF ENHANCING RESIDUAL COMPRESSIVE STRESS IN DOUBLE METALLIC TUBES

BACKGROUND OF THE INVENTION

The present invention relates to a method of enhancing residual compressive stress in double metallic tubes.

It is known that in metallic materials, for example, austenitic stainless steels which are widely used in nuclear powers and chemical plants, corrosion cracking rapidly proceeds when there exist both tensile stress and a corrosion factor. There has been proposed a method for overcoming such a defect in a metallic pipe by providing a residual compressive stress in it. In this method, the metallic pipe is induction heated for providing the temperature difference between its inner and outer faces to generate thermal stress larger than its yield point, while cooling water passes through it. This results in a residual compressive stress in a radially inner portion of a welded portion, such as a joint, of the metallic pipe.

This prior art method may be applied to metallic pipes having simple configurations such as straight pipe. In double metallic pipes, for example, a double metallic pipe having a thermal sleeve concentrically fitted into it, it is, however, very hard to provide the temperature difference to generate sufficient residual compressive stress in it since circulation of cooling water is prevented due to residence of the cooling water between the inner and outer pipes.

Accordingly, it is an object of the present invention to provide a method of enhancing residual compressive stress in a double metallic tube, in which a necessary radial temperature difference between the inner and outer face of the outer pipe is provided with ease for generating sufficient residual compressive stress.

SUMMARY OF THE INVENTION

With this and other objects in view, the present invention provides a method of enhancing residual compressive stress in a horizontal double metallic pipe which includes an outer pipe and an inner pipe fitted into the outer pipe. Cooling water is introduced into both the inner pipe and an annular space defined between the inner pipe and the outer pipe. Further, cooling water is injected into the annular space to form a partial cooling water flow through the cooling water in the annular space. During the injection of cooling water, the outer pipe is heated from the outside thereof to generate a temperature difference between the inner and outer faces to such a degree that thermal stress larger than a yield point is produced in the outer pipe. Then, the heating of the outer pipe is stopped to allow it to stand, whereby residual compressive stress is provided to a radially inner portion of the outer pipe.

BRIEF DESCRIPTION OF THE DRAWINGS

The invention will now be described by way of example with reference to the accompanying drawings in which.

DETAILED DESCRIPTION OF THE PREFERRED EMBODIMENT

Figure 1:
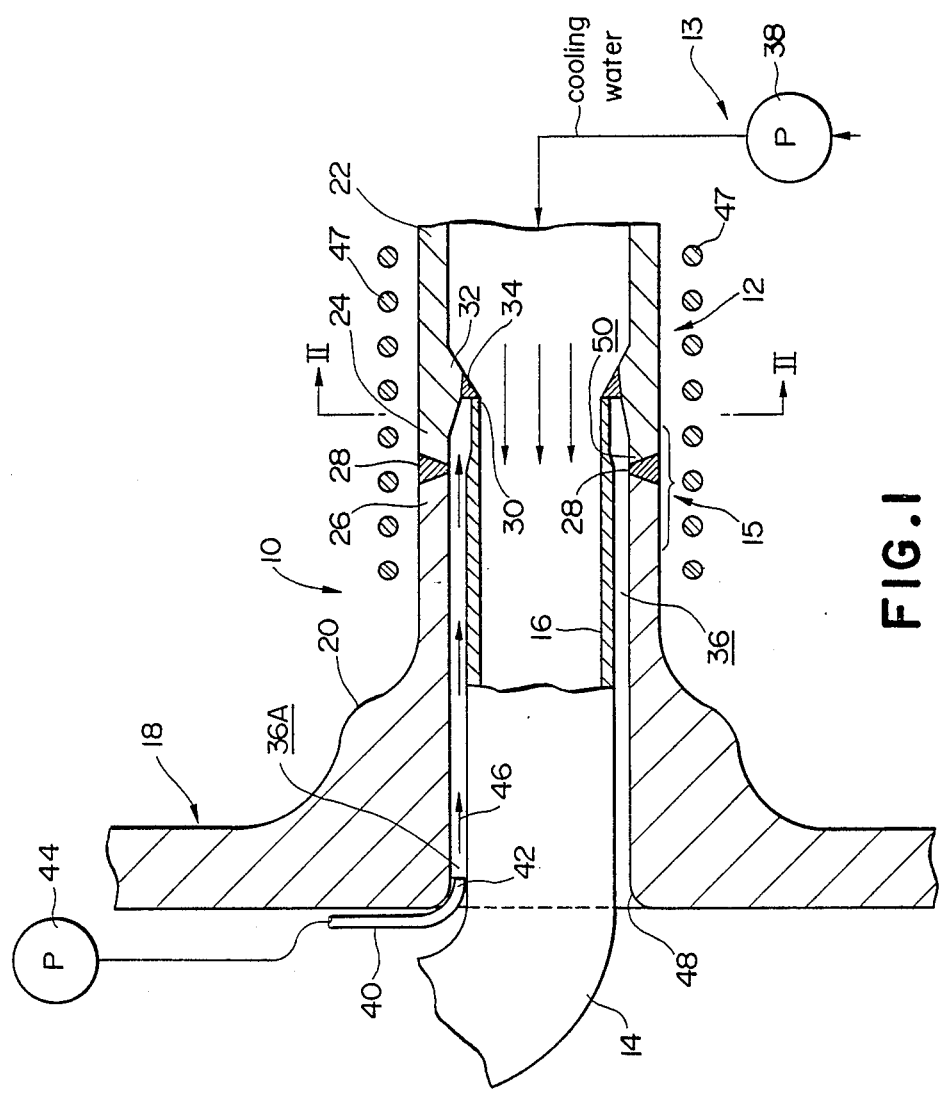
FIG. 1 is an axial section of a double metallic pipe of a cooling water recirculating system of a boiling-water reactor, the present invention being applied to the double metallic pipe.
Figure 2:
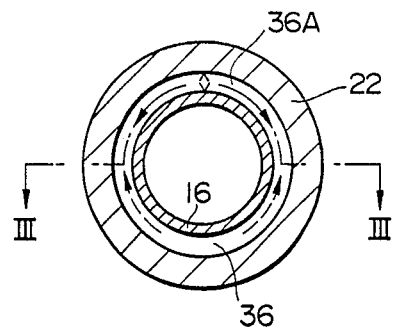
FIG. 2 is a view taken along the line II—II in FIG. 1 in a reduced scale.

Referring to FIGS. 1 and 2, a double metallic pipe 10 to which is applied the present invention includes both part of a main pipe 12 of a cooling water recirculating system 13 of a boiling-water reactor and a proximal portion 16 of a thermal sleeve 14 coaxially fitted in the main pipe 12. The double metallic pipe 10 extends horizontally outwards from a reactor pressure vessel 18. The main pipe 12 is made of an austenitic stainless steel (18Cr-8Ni) and it has a nozzle 20 mounted to the reactor pressure vessel 18, and a safe-end 22 welded at its proximal end 24 coaxially to the tip 26 of the nozzle 20 through a butt weld joint 28. The thermal sleeve 14 is welded at its outer end 30 to a educed inner diameter portion 32 of the proximal end 24 of the safe-end 22 through another weld joint 34 so as to define an annular space 36 between the main pipe 12 and it. The nozzle 20, the proximal end 24 of the safe-end 22 and the welded joint 28 constitutes an outer pipe 15 of the double pipe 10.

The safe-end 22 is connected to a recirculating pump 38 of the reactor cooling water recirculating unit 13. When cooling water is supplied by means of the recirculating pump 38 through the safe-end 22 and then through the thermal sleeve 14 into the reactor pressure vessel 18, it enters into and occupies the annular space 36 between the outer pipe 15 and the thermal sleeve 14. The cooling water within the annular space 36 stays there without flowing.

For preventing such residence of cooling water, a cooling water injection nozzle 40 is mounted to the inner wall of the reactor pressure vessel 18. The cooling water injection nozzle 40 is bent a right angle at its one end portion, and its tip portion 42 is inserted into the annular space 36 to extend axially in the upper portion 36A thereof, in this embodiment, at the highest level in it. The cooling water injection nozzle 40 is connected at the other end to a pump 44, from which cooling water within the reactor pressure vessel 18 is pumped to the nozzle 40. The main pipe 12 has a main pipe induction heating coil 47 wound around it to surround the welded joints 28 and 34.

Figure 3:
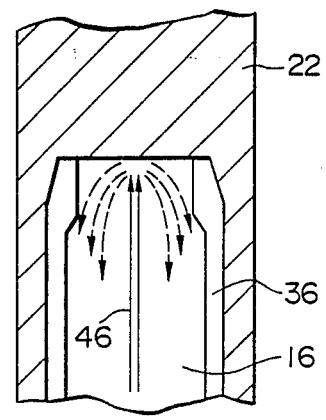
FIG. 3 is a view taken along the line III—III in FIG. 2.

In operation, cooling water within the pressure vessel 18 is pumped by means of the pump 44 through the cooling water injection nozzle 40 into the annular space 36 to form a partial cooling water flow 46, which flows axially through the cooling water, staying in the annular space, at the highest level in the space 36 as illustrated by the arrows in FIG. 1. When the partial cooling water flow 46 impinges upon the weld joint 34 between the safe-end and the thermal sleeve 14, it changes its direction and flows partially downwards as shown in FIG. 2. The rest of the partial cooling water flow 46 flows backwards as illustrated by the directed, broken lines in FIG. 3. Thus, the partial cooling water flow 46 diverges, so that it provides substantially little influence on the cooling water which stays in middle and lower portions of the annular space 36.

In this state, the main pipe induction heating coil 47 is energized by supplying high frequency current to it, so that the main pipe 12, which surrounds the annular space 36, is induction heated. Thus, cooling water in the lower portion of the annular space 36 becomes considerably higher in temperature than cooling water in the upper portion thereof. This causes upward streams of cooling water to be produced within the annular space 36 as illustrated by the directed, broken lines in FIG. 2, with the result that the upward streams join the backwards streams, shown by the directed, broken lines in FIG. 3, of the partial cooling water flow 46 and then flow towards the open end 48 of the annular space 36. Thus, cooling water is forced to flow out of the annular space 36 into the reactor pressure vessel 18.

Fresh cooling water thus forcedly circulated is consistently brought into contact with the inner face of the outer pipe 15 of the double metallic pipe 10, i.e., inner faces of both the injection nozzle 20 and the proximal end 24 of the safe-end 22, so that the temperature at the inner faces is kept below the nuclear boiling temperature. The difference in temperature between the inner and outer faces of the main pipe 12 near the welded joints 23 and 34 is set to about 200° C. or higher while the temperature of the outer face thereof is set to about 550° C. or lower for preventing any sensitized zone from being produced in the metallic structure of the wall of the main pipe 12. This procedure causes a sufficient radial temperature gradient to be generated in the wall, near the welded joints 28 and 34, of the main pipe 12 for providing a thermal stress larger than a yield point of the main pipe 12 to produce plastic deformation in the wall of the main pipe 12.

During induction heating of the main pipe 12, steam, which is produced in the cooling water, moves to the upper portion of the annular space 36 where it is cooled by the partial cooling water flow 46. Then, the steam is forced to move out of the annular space 36 by the backward streams. The steam is hence prevented from staying at the upper portion of the annular space 36, so that the temperature of the inner face of the outer pipe 15 is kept not to be excessively high, e.g., below the nuclear boiling temperature.

The temperature difference $\Delta T$ between the inner and outer faces of the outer pipe or main pipe 12 and the heating duration, in the induction heating are generally defined by the following conventional formulas:

$$\Delta T \geq \frac{4\sigma_y(1-\nu)}{E\alpha}$$

$$\tau \geq 0.7 \frac{t^2}{a}$$

where $\sigma_y$ is material yield strength (kg/mm$^2$), $\nu$ Poisson's ratio, E Young's modulus (kg/mm$^2$), $\alpha$ thermal expansion coefficient (mm/°C.), t wall thickness of the main pipe (mm) and a temperature conductivity (mm$^2$/sec). Thus, for a main pipe made of an austenitic stainless steel, having the following specifications:

the neutral radius = 153 mm
the wall thickness = 31.5 mm
$\sigma_y$ = 25 kg/mm$^2$
$\nu$ = 0.3
E = 20000 kg/mm$^2$
$\alpha$ = 1.6 × 10$^{-5}$ mm/°C.
a = 3.8 mm$^2$/sec
the temperature difference $\Delta T$ is not lower than 219° C. and the heating duration is not shorter than 183 seconds.

After the induction heating of the main pipe 12 near the welded joints 28 and 34 for a predetermined time, the induction heat coil 47 is deenergized. The main pipe 12 is thus uniformly cooled by cooling water to the normal temperature, i.e., about 40° C. In this state, a residual compressive stress is provided in a radially inner portion 50 of the main pipe 12 near both the welded joints 28 and 34.

Although in this embodiment, the double metallic pipe 10 is subjected to the heat treatment during the circulation of cooling water through both the safe-end 22 and the thermal sleeve 14, it is possible to carry out the present invention with cooling water being stayed there and not flowing.

It will be apparent to one skilled in the art that the present invention may be applied to other double metallic pipes in which cooling water is stayed between the inner and outer pipes.

What is claimed is:

1. A method of enhancing residual compressive stress in horizontal double metallic pipe constructed of an outer pipe made of an austenitic stainless steel which comprises the main pipe of a boiling water reactor pressure vessel with the main pipe including a nozzle and a safe-end welded coaxially to the nozzle through a first weld joint, and an inner pipe fitted into the outer pipe which is a thermal sleeve welded at one end thereof to the inner face of the main pipe through a second welded joint, said main pipe having been induction heated near said first and second welded joints to produce residual compressive stress in the first and second welded joints, comprising the steps of:

(a) introducing cooling water into both the inner pipe and the annular space defined between the inner pipe and the outer pipe, said annular space having an upper portion;

(b) injecting cooling water into said upper portion of the annular space to form a partial cooling water flow through the cooling water in the annular space;

(c) during the step (b), heating the outer pipe from the outside thereof by high frequency induction heating for a time period $\tau$ defined by the expression:

$$\tau \geq 0.7 t^2/a$$

wherein t is the wall thickness in mm of the outer pipe, and a is the temperature conductivity in mm$^2$ of the outer pipe, to generate a temperature difference between the inner and outer faces thereof to such a degree that a thermal stress larger than a yield point is produced in the outer pipe, said temperature difference being defined by the expression:

$$\Delta T \geq \frac{4\sigma_y(1-\nu)}{E\alpha}$$

wherein $\sigma_y$, $\nu$, E, and $\alpha$ are material yield strength in kg/km$^2$, Poisson's ratio, Young's modulus in kg/mm$^2$ and the thermal expansion coefficient in mm/°C., respectively; and (d) then, stopping the heating of the outer pipe and allowing the outer pipe to stand, whereby residual compressive stress is provided to a radially inner portion of the outer pipe.

2. A method as recited in claim 1, wherein the temperature difference is 200° C. or more and the outer face of the main pipe is kept at 550° C. or below during the high frequency induction heating.

* * * * *